US012266980B2

(12) United States Patent
Suzuki et al.

(10) Patent No.: US 12,266,980 B2
(45) Date of Patent: Apr. 1, 2025

(54) ROTARY ELECTRIC MACHINE AND METHOD OF MANUFACTURING ROTARY ELECTRIC MACHINE

(71) Applicant: Mitsubishi Electric Corporation, Tokyo (JP)

(72) Inventors: Junya Suzuki, Tokyo (JP); Mitoru Yabe, Tokyo (JP); Hideya Nishikawa, Tokyo (JP); Masafumi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 219 days.

(21) Appl. No.: 18/012,708

(22) PCT Filed: Sep. 9, 2020

(86) PCT No.: PCT/JP2020/034124
§ 371 (c)(1),
(2) Date: Dec. 23, 2022

(87) PCT Pub. No.: WO2022/054168
PCT Pub. Date: Mar. 17, 2022

(65) Prior Publication Data
US 2023/0336041 A1 Oct. 19, 2023

(51) Int. Cl.
*H02K 1/28* (2006.01)
*H02K 1/278* (2022.01)

(52) U.S. Cl.
CPC .............. *H02K 1/28* (2013.01); *H02K 1/278* (2013.01)

(58) Field of Classification Search
CPC ................................ H02K 1/278; H02K 1/28
(Continued)

(56) References Cited

U.S. PATENT DOCUMENTS 7,843,093 B2 * 11/2010 Mizumaki .............. H02K 37/16
310/49.01
7,876,013 B2 * 1/2011 Okubo .................... H02K 1/278
310/156.47
(Continued)

FOREIGN PATENT DOCUMENTS

JP 2005-020887 A 1/2005
JP 2005-354768 A 12/2005
(Continued)

OTHER PUBLICATIONS

Office Action issued Aug. 29, 2023 in Japanese Application No. 2022-548294.
(Continued)

*Primary Examiner* — Rashad H Johnson
(74) *Attorney, Agent, or Firm* — Sughrue Mion, PLLC

(57) ABSTRACT

A rotary electric machine includes a stator, a rotor core provided on an inner circumferential side of the stator and fixed to an output shaft of a rotor, a plurality of magnets arranged in a circumferential direction and fixed to an outer circumferential portion of the rotor core, and a magnet holder fixing the magnets to the outer circumferential portion of the rotor core, the magnet holder includes a base portion through which the output shaft is inserted, and an arm portion connected to the base portion, and the base portion includes an inner circumferential portion having an annular shape, an outer circumferential beam which has an annular shape and is provided on an outer circumferential side of the inner circumferential portion and to which the arm portion is connected, and a connection beam connecting the inner circumferential portion and the outer circumferential beam.

10 Claims, 16 Drawing Sheets

(58) Field of Classification Search
USPC .................................................. 310/156.22
See application file for complete search history.

(56) References Cited

U.S. PATENT DOCUMENTS

| | | | |
|---|---|---|---|
| 11,569,699 B2* | 1/2023 | Saito | H02K 15/03 |
| 2008/0048517 A1* | 2/2008 | Ochiai | H02K 1/278 |
| | | | 310/216.004 |
| 2009/0001838 A1* | 1/2009 | Okubo | H02K 29/08 |
| | | | 310/156.16 |
| 2009/0001839 A1* | 1/2009 | Masayuki | H02K 29/08 |
| | | | 310/156.16 |
| 2012/0139382 A1 | 6/2012 | Yamagishi et al. | |
| 2015/0001978 A1* | 1/2015 | Haga | H02K 1/274 |
| | | | 310/156.12 |
| 2019/0140493 A1* | 5/2019 | Takahashi | A45D 20/12 |
| 2021/0023700 A1* | 1/2021 | Liu | B25J 9/126 |
| 2021/0203200 A1* | 7/2021 | Shiono | H02K 21/14 |
| 2023/0246497 A1* | 8/2023 | Yabe | H02K 15/03 |
| | | | 310/156.22 |
| 2023/0261534 A1* | 8/2023 | Suzuki | H02K 1/28 |
| | | | 310/156.22 |
| 2023/0336041 A1* | 10/2023 | Suzuki | H02K 1/2781 |

FOREIGN PATENT DOCUMENTS

| | | |
|---|---|---|
| JP | 2012-125000 A | 6/2012 |
| JP | 2018-160956 A | 10/2018 |
| JP | 2019-115121 A | 7/2019 |
| WO | 2007/080888 A1 | 7/2007 |

OTHER PUBLICATIONS

International Search Report for PCT/JP2020/034124 dated Oct. 20, 2020 (PCT/ISA/210).

* cited by examiner

14

ROTARY ELECTRIC MACHINE AND METHOD OF MANUFACTURING ROTARY ELECTRIC MACHINE

CROSS REFERENCE TO RELATED APPLICATIONS

This application is a National Stage of International Application No. PCT/JP2020/034124 filed Sep. 9, 2020.

TECHNICAL FIELD

The present invention relates to a rotary electric machine for motors, generators and the like.

BACKGROUND ART

Regarding an internal rotating type rotary electric machine, there has been developed a rotary electric machine in which a plurality of magnets arranged in a circumferential direction are disposed on an outer circumference of a rotor core, and the magnets are fixed on the outer circumference of the rotor core by a magnet holder made of non-magnetic material. The magnet holder includes comb-shaped arm portions extending in an axial direction of an output shaft, and the movement of the magnets is restricted by the arm portions. In a case where the magnet holder is used to fix the magnets, it is necessary to suppress an opening in the arm portions in a radial direction, in order to prevent vibration in the magnets, which causes deterioration of the performance of the rotary electric machine. Conventionally, a magnet holder includes a base portion which is fixed to the output shaft, and arm portions which extend in the axial direction from the base portion. By making a width in the circumferential direction of a bridge portion that connects the base portion and the arm portion smaller than a width of the arm portion in the circumferential direction, opening in the arm portions in the radial direction is suppressed (e.g., refer to Patent Document 1).

CITATION LIST

Patent Document

[Patent Document 1]
  PCT International Publication No. WO2007/080888

SUMMARY OF INVENTION

Technical Problem

When the width of the bridge portion in the circumferential direction is smaller than the width of the arm portion in the circumferential direction, deformation occurs with the bridge portion as a starting point, opening in the arm portions occurs, and a gap is formed between the magnet and an end portion of the arm portion on a side opposite to a side where the bridge portion is provided. For this reason, it becomes difficult to suppress vibration in the magnets, the positioning accuracy of the magnets does not improve, and the performance of the rotary electric machine degrades.

The present disclosure has been made in view of the above circumstances, and an object thereof is to provide a rotary electric machine capable of suppressing vibration in magnets fixed to a rotor core and improving the positioning accuracy of the magnets.

Solution to Problem

A rotary electric machine according to the present disclosure includes a stator, a rotor core provided on an inner circumferential side of the stator and fixed to an output shaft of a rotor, a plurality of magnets arranged in a circumferential direction and fixed to an outer circumferential portion of the rotor core, and a magnet holder fixing the plurality of magnets to the outer circumferential portion of the rotor core, in which the magnet holder includes a base portion which is provided on a side of one surface of the rotor core in an axial direction and through which the output shaft is inserted, and an arm portion which has a first end connected to the base portion and extends in the axial direction, and the base portion includes an inner circumferential portion having an annular shape, an outer circumferential beam having an annular shape and provided on an outer circumferential side of the inner circumferential portion, and a connection beam connecting the inner circumferential portion and the outer circumferential beam, the first end of the arm portion being connected to the outer circumferential beam.

A method of manufacturing a rotary electric machine according to the present disclosure includes arranging a plurality of magnets in a circumferential direction and disposing the plurality of magnets on an outer circumferential portion of a rotor core, disposing a base portion of a magnet holder on a side of one surface of the rotor core in an axial direction, the base portion including an inner circumferential portion having an annular shape, an outer circumferential beam having an annular shape and provided on an outer circumferential side of the inner circumferential portion, and a connection beam connecting the inner circumferential portion and the outer circumferential beam, and disposing an arm portion, which has a first end connected to the outer circumferential beam and extends in the axial direction, of the magnet holder on an outer circumferential surface of the magnet and pressing the magnet via the arm portion by the outer circumferential beam to fix the magnet between the arm portion and the outer circumferential portion of the rotor core.

Advantageous Effects of Invention

According to the present disclosure, because the magnets are fixed to the rotor core by the magnet holder while suppressing vibration in the magnets, the positioning accuracy of the magnets is improved, and the performance of the rotary electric machine is improved.

DESCRIPTION OF EMBODIMENTS

Hereinafter, the embodiments will be described below based on the drawings.

First Embodiment

Figure 1:
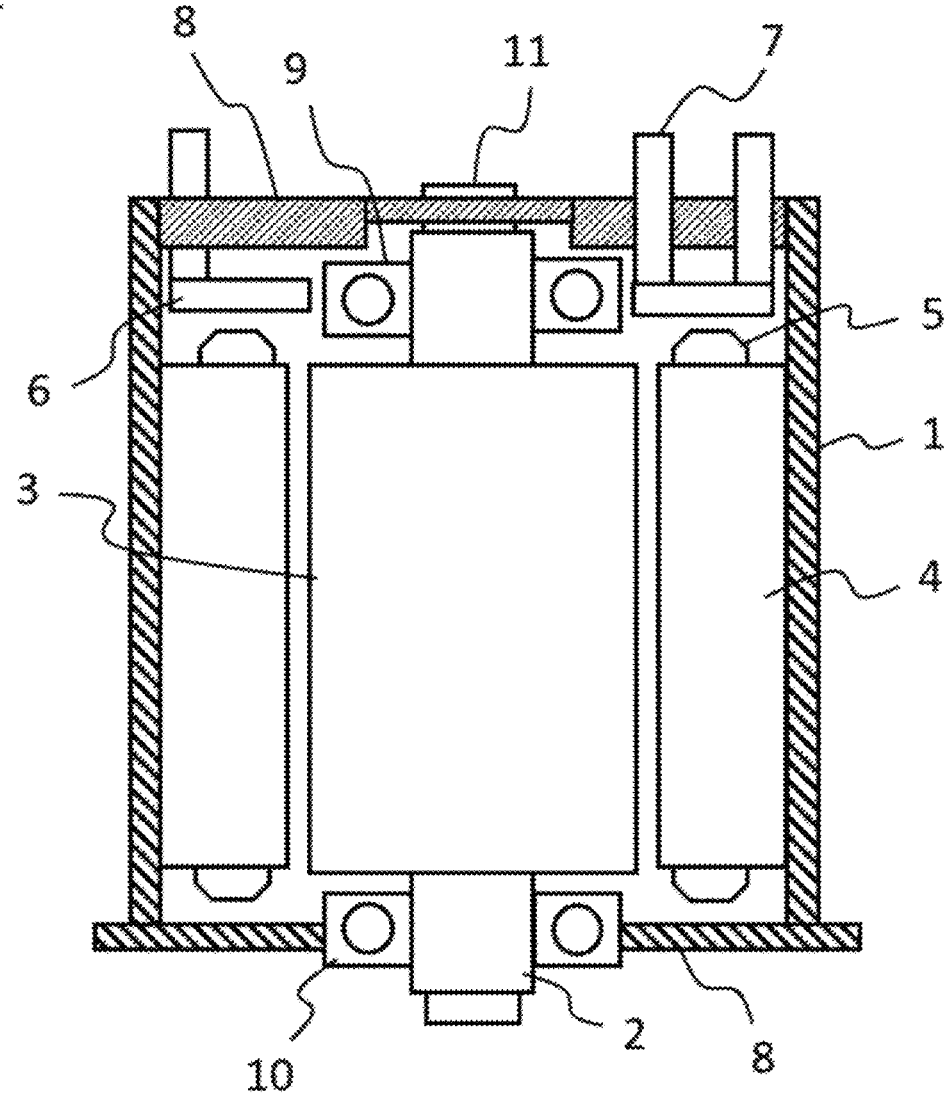
FIG. 1 is a cross-sectional view schematically showing a rotary electric machine according to a first embodiment.

FIG. 1 shows a cross-sectional view schematically showing a rotary electric machine 100 according to a first embodiment. The rotary electric machine 100 includes a stator 4 fixed inside a toroidal motor case 1, and a rotor 3 provided on an inner circumferential side of the stator 4 and having an output shaft 2 to output the rotation torque to the outside of the rotary electric machine 100. A gap is formed in between the rotor 3 and the stator 4, and an outer circumferential surface of the rotor 3 and an inner circumferential surface of the stator 4 face each other.

The stator 4 has a stator core (figure not shown), and an armature winding 5 is wound to the stator core. The stator 4 is fixed to the inner surface of the motor case 1 for example, by press fitting or the like. An annular wiring portion 6 is disposed in the vicinity of the armature winding 5 in a top portion of FIG. 1, and is connected to the armature winding 5 for example, by TIG (Tungsten Inert Gas) welding or the like.

An end portion winding 7 extends in the axial direction from the annular wiring portion 6 and penetrates a frame 8, and is connected to an end portion of the armature winding 5 via the annular wiring portion 6. Furthermore, in the end portion winding 7, three conductors connected to a U phase winding end portion, a V phase winding end portion, and a W phase winding end portion of the armature winding 5, respectively, are grouped together. By having a control device (figure not shown) sequentially conduct a predetermined current based on the phase of the rotor 3 in each of the U phase, V phase, and W phase wires of the armature winding 5, the rotor 3 can be made to rotate. Hereinafter, the axial direction of the output shaft 2 is referred to as an axial direction.

Next, the rotor 3 will be explained. The output shaft 2 of the rotor 3 is supported by a first bearing 9 and a second bearing 10 in a freely rotatable manner. In an example in FIG. 1, the first bearing 9 is provided in the center portion of the frame 8 which blocks the inside portion of the rotary electric machine 100, and the second bearing 10 is provided in the frame 8 on an output side (a lower side in FIG. 1) of the rotation axis. In this manner, the first bearing 9 and the second bearing 10 are respectively disposed on the upper and lower sides of the rotor 3.

Here, a sensor rotor 11 having a rotary sensor (figure not shown) may be fixed on an end portion of the output shaft 2 on an opposite-output side (an upper side in FIG. 1). In this case, the rotary sensor may be provided with a gap formed between the rotary sensor and the end surface of the sensor rotor 11 in the axial direction. For example, the sensor rotor 11 may be a magnetic sensor type, in other words, a sensor having a pair or multiple pairs of permanent magnets. By providing the sensor rotor 11 in the rotary electric machine 100, as the permanent magnets of the sensor rotor 11 rotate along with the rotation of the output shaft 2, the rotary sensor detects the change in the magnetic flux of the permanent magnets of the sensor rotor 11 and transforms it to an electric signal, and therefore it is possible to obtain information on the rotational speed of the output shaft 2 and the like. Furthermore, the sensor rotor 11 may be a resolver or a hall sensor if the sensor rotor 11 is capable of obtaining information on the rotational speed of the output shaft 2 and the like.

Figure 2:
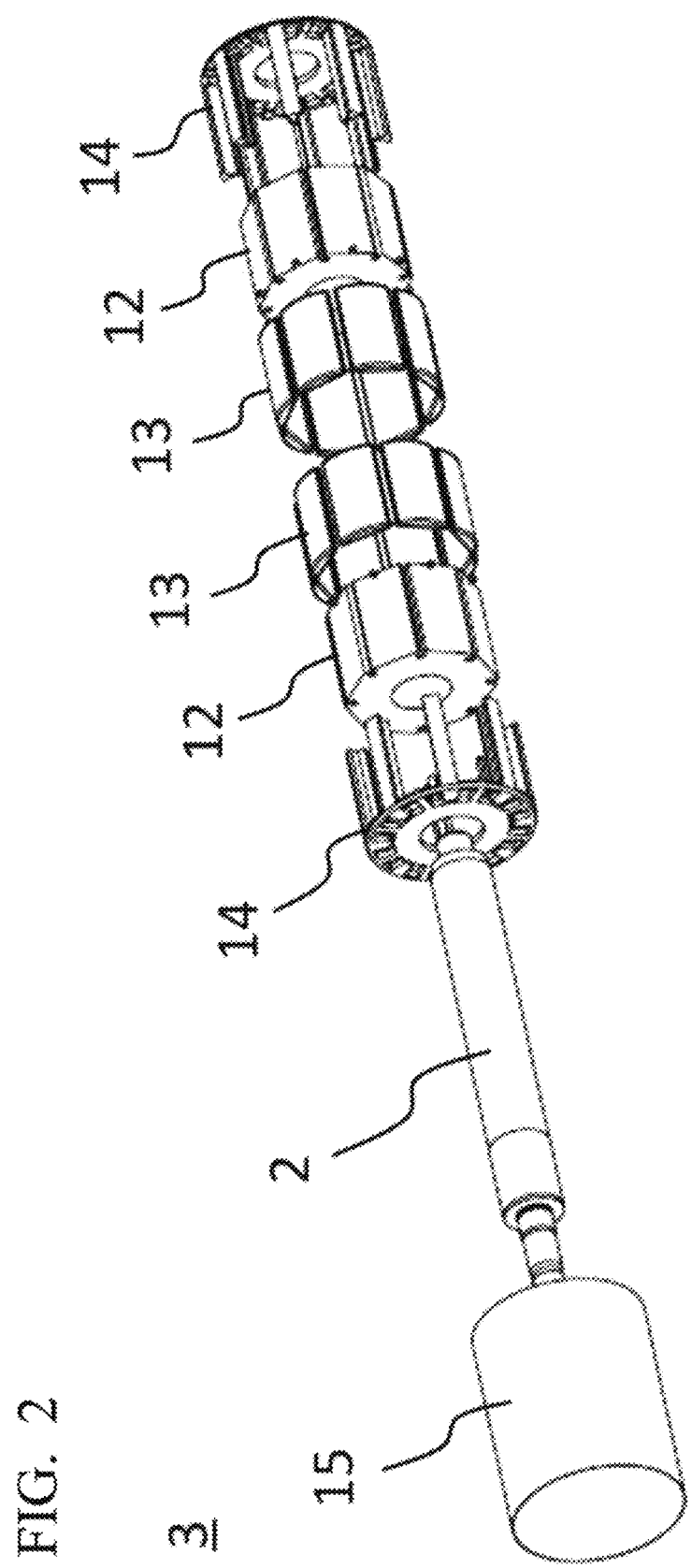
FIG. 2 is an exploded perspective view showing a rotor according to the first embodiment.

FIG. 2 is an exploded perspective view showing the rotor 3 according to the first embodiment. The rotor 3 includes the output shaft 2, a rotor core 12 fixed to the output shaft 2, magnets 13 fixed to an outer circumferential portion 18 of the rotor core 12, and a magnet holder 14 fixing the magnets 13 to the rotor core 12. In addition, the rotor 3 includes a toroidal cover 15 provided on the outer circumferential side of the rotor core 12, the magnets 13 and the magnet holder 14. As the rotor 3 includes the cover 15, it is possible to suppress a case where the magnet 13 disperses in the rotary electric machine 100 when the magnet 13 is damaged, which may cause the rotary electric machine 100 non-operational. Furthermore, for example, the magnet 13 may be a segment shaped permanent magnet.

Also, the rotor 3 is what is known as a step-skew structure rotor. In an example of FIG. 2, two rotor cores 12 are disposed in a column manner in the axial direction, and eight magnets 13 are fixed to the outer circumferential portion 18 of each rotor core 12 along the circumferential direction of the rotor 3. Hereinafter, the circumferential direction of the rotor 3 is referred to as a circumferential direction.

The magnets 13 with similar polarity are fixed to the rotor cores 12 adjacent to each other, respectively, at positions shifted by a predetermined angle in the circumferential direction, in other words, by a predetermined step angle. In this manner, it is possible to reduce the cogging torque ripple and the energizing torque ripple. If the cogging torque and the energizing torque ripple are reduced, when the rotary electric machine 100 is used for electric power steering systems for example, it is possible to suppress vibration caused by the cogging torque ripple or the energizing torque ripple from being transmitted through the steering wheel to the vehicle operator. Here, the cogging torque ripple is the fluctuation in torque generated from rotation of the rotor 3 when it is not being energized, and the energizing torque ripple is the fluctuation in torque occurring when the rotor 3 is rotating.

Figure 3:
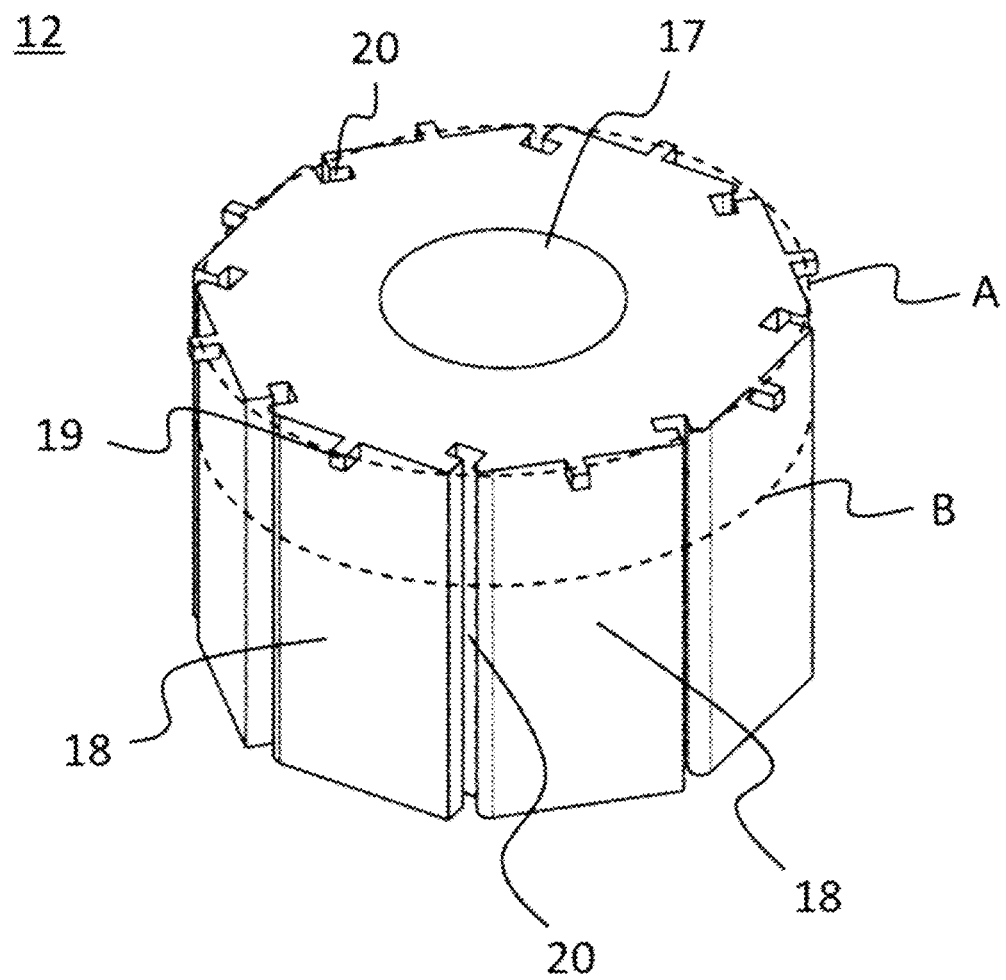
FIG. 3 is a perspective view showing a rotor core according to the first embodiment.

FIG. 3 is a perspective view showing the rotor core 12 according to the first embodiment. For example, the rotor core 12 is formed by stacking core plates each of which has a thickness of approximately 0.5 mm and is made from magnetic material such as an electromagnetic steel plate, and is provided on the inner circumferential side of the stator 4. The core plates which constitute the rotor core 12 are stacked and fixed to each other by being pulled out and crimped, welded, or by using an adhesive or the like. Also, a fixing hole 17 is provided in the center portion of the rotor core 12 in a plan view (when the rotor core 12 is viewed in the axial direction), and the rotor core 12 and the output shaft 2 are fixed by inserting the output shaft 2 into the fixing hole 17.

In addition, protruding portions 19 are provided on the outer circumferential portion 18 of the rotor core 12 to which the magnets 13 are fixed so that the protruding portions 19 protrude outward in the radial direction of the rotor core 3, and the protruding portions 19 are disposed on an end portion in the axial direction of the outer circumferential portion 18 on a side opposite to a side where a base portion 22 of a magnet holder 14, to be described later, is provided. In an example of FIG. 3, the protruding portions 19 are provided in an upper end portion in FIG. 3 of the rotor core 12. By providing the protruding portions 19 on the outer circumferential portion 18 of the rotor core 12, when the magnets 13 are fixed to the outer circumferential portion 18 of the rotor core 12, the protruding portions 19 abut with the magnets 13, and it is possible to regulate the movement of the magnets 13 in the axial direction, thereby improving the positioning accuracy of the magnets 13 in the axial direction.

Figure 4A:
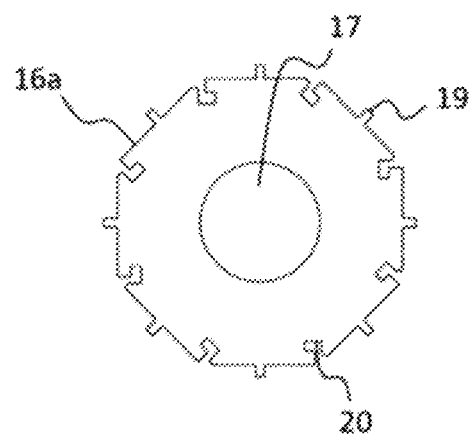
FIGS. 4A and 4B are cross-sectional views showing the rotor core according to the first embodiment.
Figure 4B:
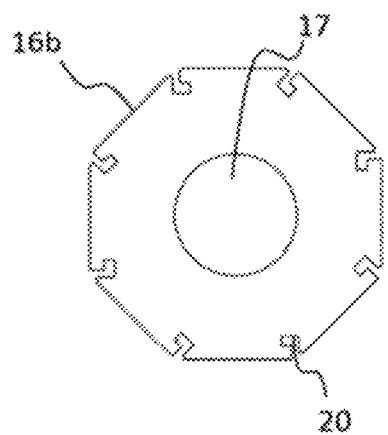

Also, mating portions 20 formed in a grooved shape are provided in the rotor core 12. FIGS. 4A and 4B are cross-sectional views showing the rotor core 12 according to the first embodiment. FIG. 4A shows a cross-sectional view of the rotor core 12 taken along in dashed line A of FIG. 3, and FIG. 4B shows a cross-sectional view of the rotor core 12 taken along in dashed line B of FIG. 3. The rotor core 12 is formed by stacking a core plate 16a provided with the protruding portions 19 as shown in FIG. 4A, and a core plate 16b not provided with a protruding portion 19 as shown in FIG. 4B. Also, the core plates 16a and 16b have the mating portions 20 provided in connection in the axial direction (the direction through the paper on FIGS. 4A and 4B). The mating portion 20 is formed in an L shape in a plan view, and mates with an arm portion 21 of the magnet holder 14, which will be described later on.

Figure 5:
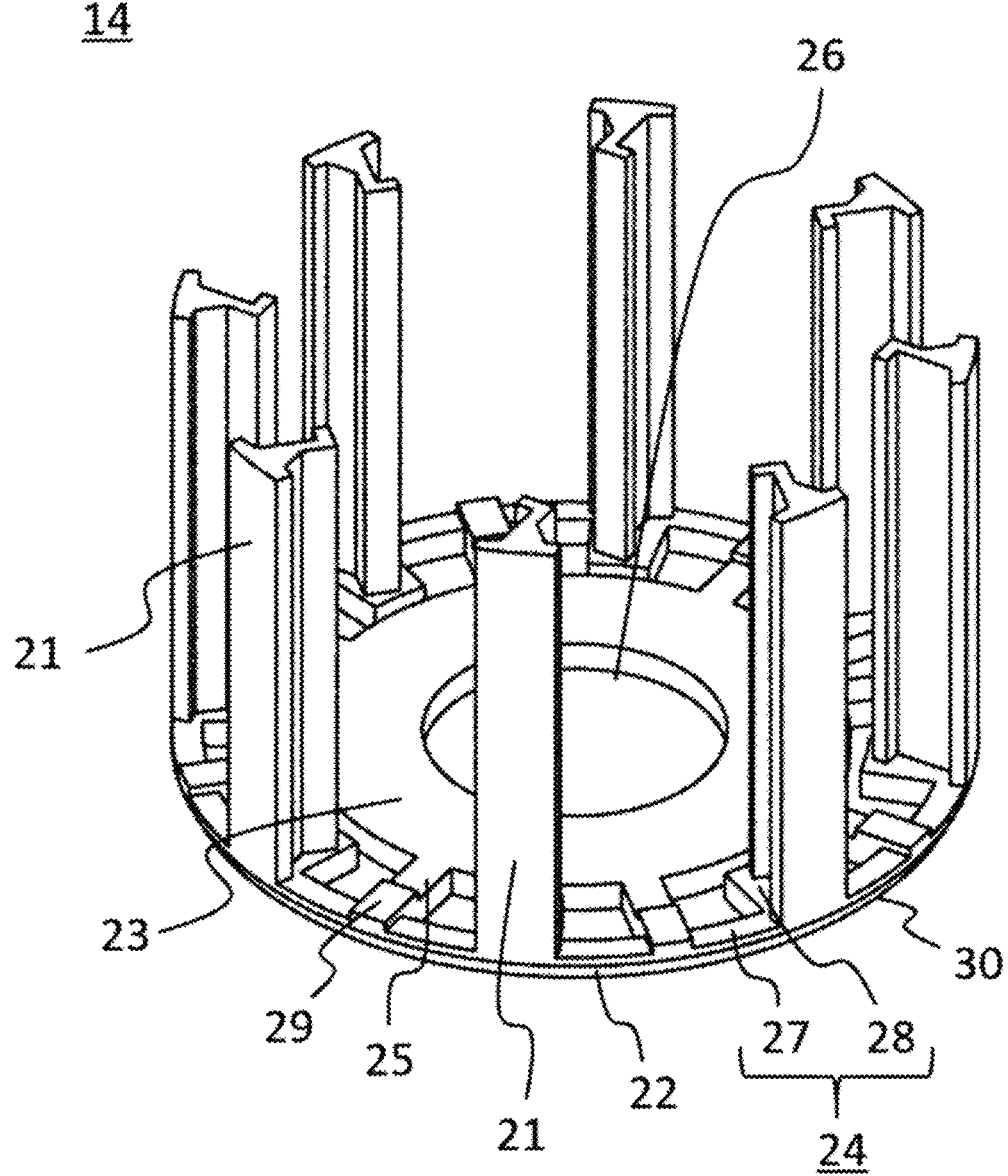
FIG. 5 is a perspective view showing a magnet holder according to the first embodiment.

Hereinafter, the magnet holder 14 of the present embodiment will be explained. FIG. 5 is a perspective view showing the magnet holder 14 according to the first embodiment. The magnet holder 14 is formed, for example, from non-magnetic material such as resin or the like, and includes the base portion 22 provided on a side of one surface of the rotor core 12 in the axial direction, and the arm portions 21 extending in the axial direction of the output shaft 2 and each having a first end connected to the base portion 22. Furthermore, the plurality of the magnets 13 are fixed to the outer circumferential portion 18 of the rotor core 12 by the arm portions 21, respectively.

Also, the base portion 22 of the magnet holder portion 14 includes an annular inner circumferential portion 23, an annular outer circumferential beam 24 surrounding the inner circumferential portion 23 and provided on the outer circumferential side of the inner circumferential portion 23, and connection beams 25 connecting the inner circumferential portion 23 and the outer circumferential beam 24. A through hole 26 is provided in the center portion of the inner circumferential portion 23 in a plan view, and the magnet holder 14 and the output shaft 2 are fixed by inserting the output shaft 2 through the through hole 26.

In addition, as shown in FIG. 5, the outer circumferential beam 24 has an annular shaped annular portion 27, and support portions 28 formed to extend toward the inner circumferential side from the annular portion 27. In an example of FIG. 5, the first end of the arm portion 21 is connected to the annular portion 27 and the support portion 28, so that the outer circumferential beam 24 and the arm portion 21 are connected.

Also, the inner circumferential portion 23 and the outer circumferential beam 24 are separated from each other, and the inner circumferential portion 23 and the outer circumferential beam 24 are connected by the connection beams 25 radially extending from the inner circumferential portion 23. In this manner, as the base portion 22 of the magnet holder 14 has the annular inner circumferential portion 23, the annular outer circumferential beam 24 surrounding the inner circumferential portion 23, and the connection beams 25 connecting the inner circumferential portion 23 and the outer circumferential portion 24, it is possible to prevent yielding of the arm portions 21 and it is possible to suppress the opening in the arm portions 21. Furthermore, the details of reason for the ability to suppress the opening in the arm portions 21 will be described later.

Also, the support portion 28 is preferably formed so that the support portion 28 protrudes from the arm portion 21 in a plan view, i.e. a projected area of the support portion 28 in a plan view is preferably larger than a projected area of the arm portion 21 in a plan view. In this manner, if foreign object debris were to be generated during the assembly of the rotary electric machine 100, for example damage and so on were to occur to a portion of the arm portion 21 when the arm portions 21 are inserted into the mating portions 20 of the rotor core 12, the foreign object debris can be encapsulated between the support portion 28 and the rotor core 12, thereby suppressing any irregularities in the operation of the rotary electric machine 100.

In addition, an axial holding portion 29 that holds the side surface of the magnet 13 in the axial direction is provided on the connection beam 25 and the outer circumferential beam 24 of the magnet holder 14. In an example of FIG. 5, the axial holding portion 29 straddles the annular portion 27 of the outer circumferential beam 24 and the connection beam 25, and is provided on surfaces of the annular portion 27 and the connection beam 25 on a side facing the magnet 13. Also, when the magnet holder 14 is assembled to the rotor core 12, the axial holding portion 29 is disposed on an opposite side of the protruding portion 19 of the rotor core 12, and faces the magnet 13. By disposing the axial holding portion 29 and the protruding portion 19 so that they face each other, the axial holding portion 29 and the protruding portion 19 sandwich the magnet 13 from both sides in the axial direction. Also, because the elastic force resulting from the deformation of the axial holding portion 29 acts on the magnet 13, it is possible to strongly hold the magnet 13.

Also, on a surface of the base portion 22 on a side opposite to a surface of the base portion 22 to which the arm portions 21 are connected, a guide portion 30 is formed by chamfer machining or the like so that an angle of the outer circumferential end portion of the base portion 22 becomes smaller. By providing the guide portion 30 in the base portion 22, it is possible to eliminate the lodging of the outer circumferential end portion of the base portion 22 when assembling the rotary electric machine 100, thereby making the insertion of the cover 15 easier.

Figure 6:
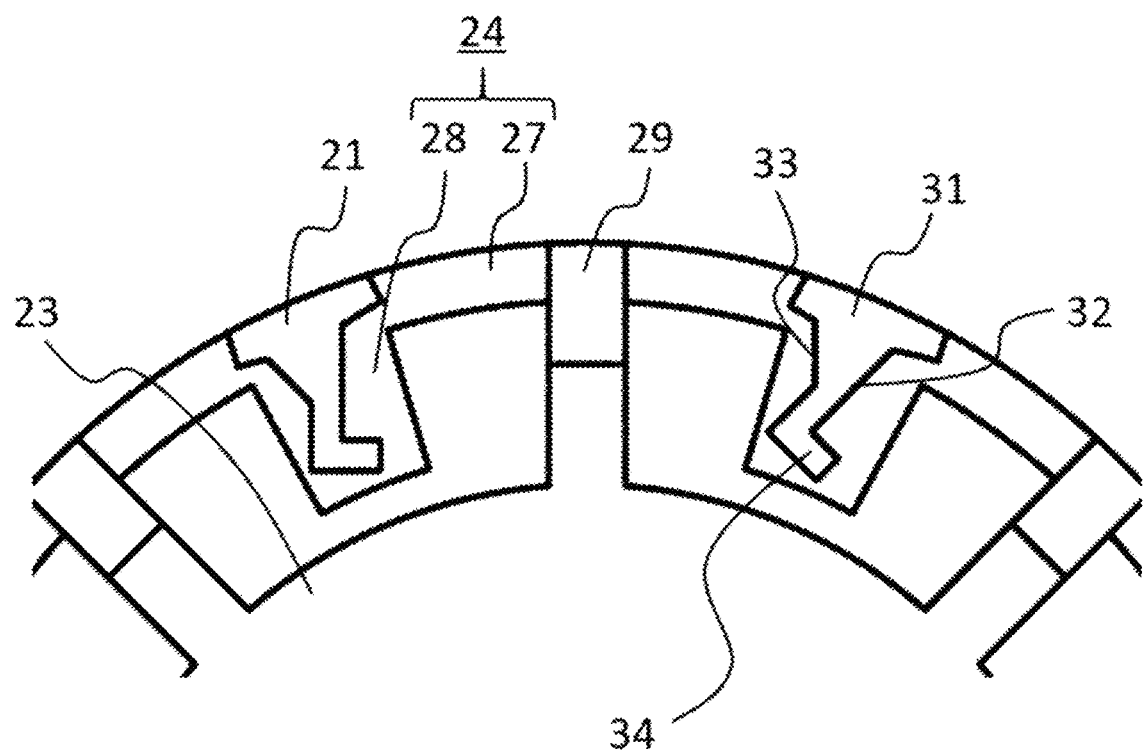
FIG. 6 is a partially-enlarged view showing the magnet holder according to the first embodiment.

Next, the arm portion 21 of the magnet holder 14 will be explained. FIG. 6 is a partially-enlarged view showing the magnet holder 14 according to the first embodiment. The arm portion 21 includes a magnet holding portion 31 that covers the outer circumferential surface of the magnet 13 and holds the magnet 13, a first retaining surface 32 and a second retaining surface 33 that abut with the side surfaces in the circumferential direction of the magnet 13 and regulate the movement of the magnet 13 in the circumferential direction, and a fall prevention portion 34 that has an angle with the first retaining surface 32 and the second retaining surface 33 provided on the inner circumferential side of the arm portion 21. Here, to cover the outer circumferential surface of the magnet 13 can include a case of only covering a portion of the outer circumferential surface of the magnet 13. Furthermore, the arm portions 21 are respectively provided in spaces in the circumferential direction between adjacent magnets 13 of the plurality of magnets 13, and the number of the arm portions 21 corresponds to the number of the plurality of magnets 13.

As shown in FIG. 6, the first retaining surface 32, the second retaining surface 33, and the fall prevention portion 34 form an L shape in a plan view. Here, it is preferable that an angle formed between the first retaining surface 32 and the fall prevention portion 34 be a right angle. In this manner, because the deformation of the arm portions 21 in the circumferential direction can be prevented when the magnets 13 are fixed by the magnet holder 14, high accuracy positioning is possible and vibration in the magnets 13 can be suppressed. Also, it is preferable that all arm portions 21 of the magnet holder 14 be identical in shape. In this case, no offset rotation occurs in the rotor 3 when being rotated, thereby increasing the performance of the rotary electric machine 100. Furthermore, standardization of parts for the rotary electric machine 100 is possible, thereby reducing manufacturing costs.

Furthermore, as the first retaining surface 32 of the arm portion 21 is formed so that the first retaining surface 32 is vertical in regards to the outer circumferential surface of the rotor core 12, because the first retaining surface 32 is press-fitted and fixed into the mating portion 20 when assembling the rotor core 12 in the magnet holder 14, it is possible to fix the magnet 13 to the rotor core 12 using the first retaining surface 32 of the magnet holder 14 as a standard for positioning the magnet 13, thereby improving the positioning accuracy of the magnets 13.

Figure 7:
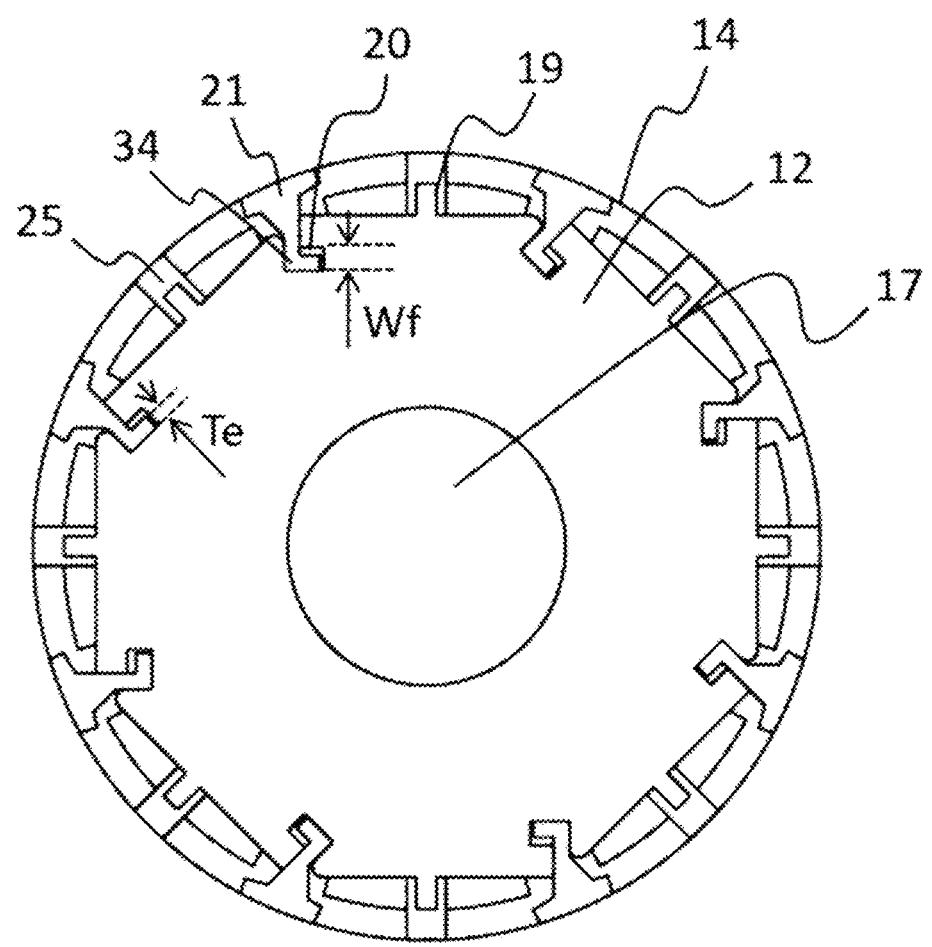
FIG. 7 is a plan view showing a part of the rotary electric machine according to the first embodiment.

FIG. 7 is a plan view showing a part of the rotary electric machine 100 according to the first embodiment. FIG. 7 is a view showing a case where the magnet holder 14 is assembled to the rotor core 12. The magnet holder 14 is fixed to the rotor core 12 by mating the arm portions 21 with the mating portions 20 of the rotor core 12. In other words, as shown in FIG. 7, a portion of the first retaining surface 32, a portion of the second retaining surface 33, and the fall prevention portion 34 of the arm portions 21 are mated with the mating portion 20 of the rotor core 12, so that the magnet holder 14 is fixed to the rotor core 12.

Here, it is preferable that the mating portion 20 of the rotor core 12 be formed such that the mating portion 20 is larger than the fall prevention portion 34 of the magnet holder 14, in other words, the width (Wf in FIG. 7) of the mating portion 20 is larger than the thickness (Te in FIG. 7) of the fall prevention portion 34. In this manner, because the fall prevention portion 34 is able to displace to the outer circumferential side within a gap formed between the mating portion 20 and the fall prevention portion 34, it is possible to suppress the load that is applied to the arm portion 21 when the magnet 13 is press-fitted into the magnet holder 14, thereby improving the load capacity of the magnet holder 14.

Figure 8A:
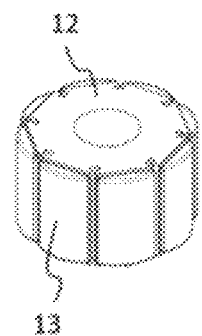
FIGS. 8A to 8E are explanatory diagrams showing assembly procedures of the rotor according to the first embodiment.

Next, a manufacturing method of the rotary electric machine 100 will be explained. FIGS. 8A to 8E are explanatory diagrams showing assembly procedures of the rotor 3 according to the first embodiment. First, after fixing the rotor core 12 and the magnets 13 to an assembly jig, as shown in FIG. 8A, the plurality of magnets 13 are arranged in the circumferential direction and disposed on the outer circumferential portion 18 of the rotor core 12.

Figure 8B:
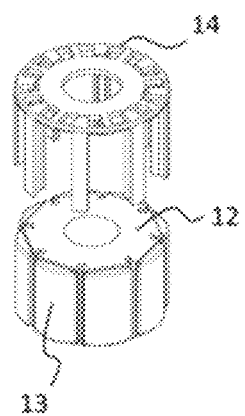

Then, as shown in FIG. 8B, the base portion 22 of the magnet holder is disposed on a side of one surface of the rotor core 12 in the axial direction, and the magnet holder 14 is inserted into the rotor core 12 in the axial direction. Here, in an example of FIG. 8B, the magnet holder 14 is inserted from a side of the protruding portions 19 of the rotor core 12. At this time, a portion of the first retaining surface 32, and a portion of the second retaining surface 33, and the fall prevention portion 34 of the arm portion 21 of the magnet holder 14 are press-fitted and fixed into the mating portion 20 of the rotor core 12, such that the magnet holder 14 is positioned with respect to the rotor core 12 and is fixed to the rotor core 12. Also, because the arm portions 21 are set to the number of the magnets 13, the plurality of the magnets 13 disposed on the outer circumferential portion 18 of the rotor core 12 are positioned and fixed at the same time by the magnet holder 14.

In addition, the base portion 22 of the magnet holder 14 is disposed on the side of one surface of the rotor core 12 in the axial direction. Due to the elasticity of the outer circumferential beam 24 of the base portion 22, the magnets 13 are fixed in between the outer circumferential portion 18 of the rotor core 12 and the arm portions 21 of the magnet holder 14. In other words, on the magnets 13, the elastic forces of the outer circumferential beam 24 act in a direction toward the inner circumferential side, and the magnets 13 are pressed toward the outer circumferential portion 18 of the rotor core 12 and are fixed thereto. Furthermore, although one set of the rotor core 12, the magnets 13, and the magnet holder 14 is shown in FIG. 8 (b), if the rotor 3 has a step-skew structure, a plurality sets of the rotor core 12, the magnets 13 and the magnet holder 14 may be assembled.

At this time, as both side surfaces of the magnet 13 in the axial direction are retained by the protruding portion 19 of the rotor core 12 and the axial holding portion 29 of the magnet holder 14, the connection beam 25 yields in the axial direction when the magnet holder 14 is inserted. By the elastic deformation of the connection beam 25 in the axial direction, the variation of sizes of the magnets 13 in the axial direction is absorbed, and the magnets 13 are held by the elastic force due to the deformation of the connection beam 25 while the magnets 13 abut with the protruding portions 19 of the rotor core 12. Accordingly, it is possible to hold the magnets 13 in the axial direction with high accuracy and with a high retaining force.

Figure 9A:
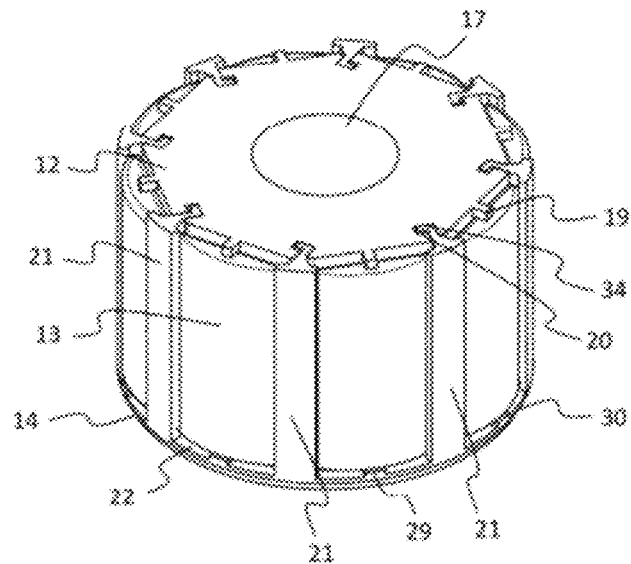
FIGS. 9A and 9B are explanatory diagrams explaining the deformation of the magnet holder according to the first embodiment.
Figure 9B:
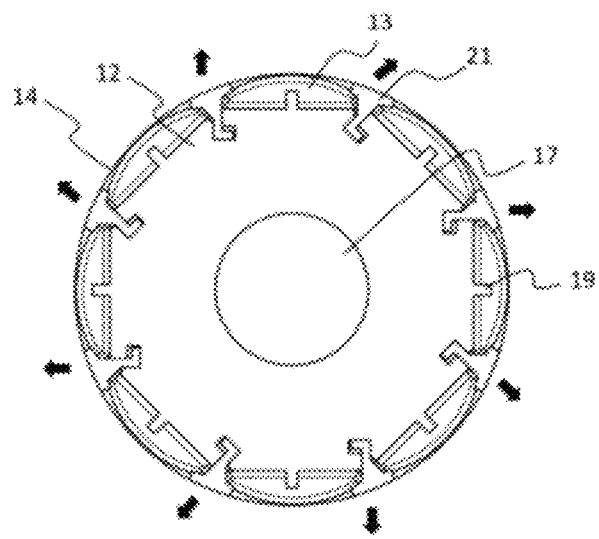

Here, the deformation of the magnet holder 14 will be explained. FIGS. 9A and 9B are explanatory diagrams explaining the deformation of the magnet holder 14 according to the first embodiment. FIG. 9A is a perspective view showing the appearance of the magnet holder 14 after the magnet holder 14 is assembled to the rotor core 12. The dimensions of the magnet holder 14 are set with the dimensional relationship in which the magnets 13 are press-fitted and fixed into the rotor core 12, in other words, the dimensions of the magnet holder 14 are set so that the magnet holder 14 expands in the outer circumferential side during assembly, and as shown in FIG. 9A, the magnet holder 14 is deformed when being assembled to the rotor core 12.

FIG. 9B is an explanatory diagram explaining the deformation of the magnet holder 14, and is a plan view showing the rotor core 12, the magnets 13, and the magnet holder 14 as seen from a side where the protruding portions 19 of the rotor core 12 are provided. When the magnet holder 14 is assembled to the rotor core 12, the arm portions 21 of the magnet holder 14 are displaced to the outer circumferential side due to the dimensional relationship of the rotor core 12, the magnets 13, and the magnet holder 14. Also, if there is a space between the mating portion 20 and the fall prevention portion 34 of the arm portion 21 of the magnet holder 14, by the deformation of the outer circumferential beam 24 of the magnet holder 14, the fall prevention portion 34 displaces to the outer circumferential side, in other words, in a direction shown by the arrows in FIG. 9B.

At this time, because the arm portions 21 displace to the outer circumferential side by the deformation of the outer circumferential beam 24 of the base portion 22, the magnets 13 are press-fitted into the magnet holder 14 without the arm portions 21 yielding, and are fixed to the rotor core 12. In this manner, because it is possible for the arm portions 21 to press the magnets 13 toward the outer circumferential portion 18 of the rotor core 12 and fix the magnets 13 to the outer circumferential portion 18 without the arm portions 21 yielding, the arm portions 21 do not open and vibration in the magnets 13 does not develop. In addition, it is preferable that a connection portion between the arm portion 21 and the base portion 22 is not made slimmer than the arm portion 21, in other words, it is preferable for the arm portion 21 to have the same overall width in the axial direction. In this manner, the deformation of the arm portions 21 on the base portion 22 side is not induced, and accordingly it is possible to further suppress the opening in the arm portions 21 on a side opposite to a side where the arm portions 21 are connected to the base portion 22, in other words, suppress the opening in the arm portions 21 on a tip side, and it is also possible to suppress the deformation of the arm portions 21 in the circumferential direction.

Figure 10:
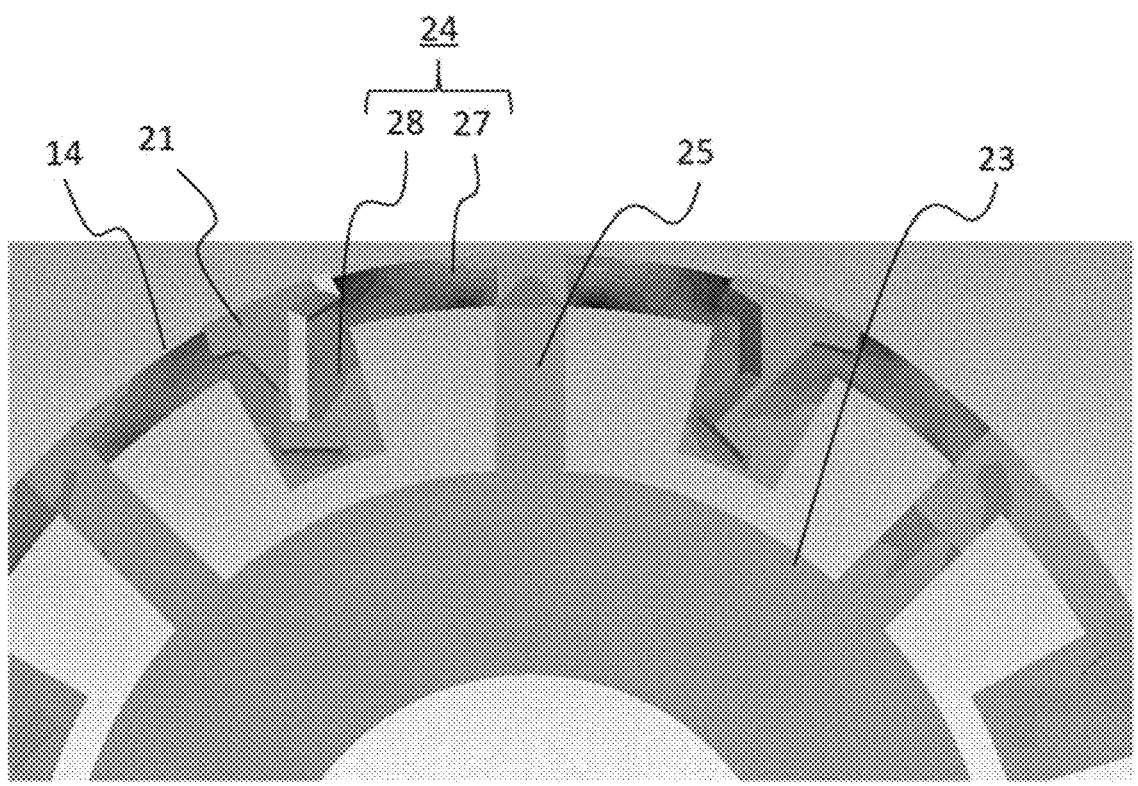
FIG. 10 is an explanatory diagram explaining the deformation of the magnet holder according to the first embodiment.

Regarding the deformation of the base portion 22, a more detailed explanation is as follows. FIG. 10 is an explanatory diagram explaining the deformation of the magnet holder 14 according to the first embodiment. The shaded area of the colors in FIG. 10 show the degree of stresses acting on the magnet holder 14, and the dark colored areas show a stronger degree of acting stresses. In other words, as the color gets darker, the amount of deformation becomes larger. Also, in FIG. 10, views of the rotor core 12 and the magnet 13 are omitted.

As shown on FIG. 10, stress strongly acts on the annular portion 27 of the outer circumferential beam 24 of the magnet holder 14, and it can be understood that a large deformation develops in the annular portion 27. By having the outer circumferential beam 24 to which the end portions of the arm portions 21 are connected deform, deformation of the arm portions 21 fixing the magnets 13 does not develop, and the positions of the arm portions 21 can be adjusted by the outer circumferential beam 24. Accordingly, because the arm portions 21 can fix the magnets 13 without yielding, the arm portions 21 do not open and vibration in the magnets 13 does not develop. In addition, because the connection beam 25 is connected to the outer circumferential beam 24 at a positon where the support portion 28 does not exist, in other words, the connection beam 25 is connected to the annular portion 27 of the circumferential beam 24, the connection beam 25 does not inhibit the deformation of the outer circumferential beam 24, and the position of the arm portion 21 can be adjusted more suitably.

Figure 8C:
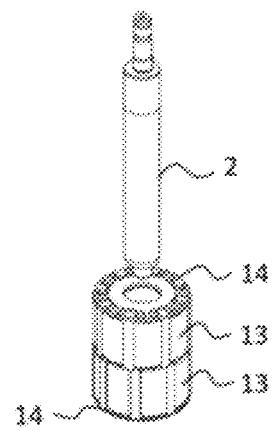

Returning to FIGS. 8A to 8E, an assembly step of the rotor 3 will be explained. In FIG. 8C, an example of the rotor 3 having a step-skew structure and including two rotor cores 12 is shown. Two rotor cores 12 of which the magnets 13 and the magnet holder 14 are fixed on each are prepared, and the two rotor cores 12 are disposed vertically.

Then, the output shaft 2 is inserted into the respective fixing holes 17 of the rotor cores 12, so that the rotor cores 12 and the output shaft 2 are fixed. Here, it is preferable that the two rotor cores 12 are disposed so that their protruding portions 19 face each other. In this manner, it is possible to secure a gap between the magnets 13 provided in the adjacent rotor cores 12 by the protruding portions 19, and an effect of reducing the cogging torque ripple and the energizing torque ripple due to the adoption of a step-skew structure can be obtained.

Figure 8D:
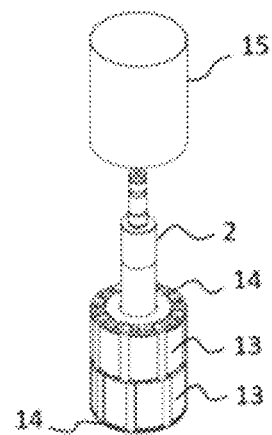
Figure 8E:
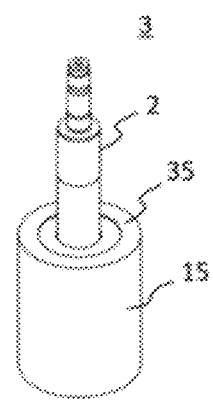

Next, as shown in FIG. 8D, the cover 15 is fitted onto the rotor cores 12, the magnets 13, and the magnet holders 14. Then, as shown in FIG. 8E, a portion of the cover 15 is folded back to form a cover end surface 35. Furthermore, by providing the axial holding portions 29, when compared to a case where the magnets 13 are retained in the axial direction only due to the retention force of the cover end surface 35 of the cover 15, the magnets 13 can be retained also due to the press-fitting force of the rotor core 12 and the magnet holder 14, and therefore it is possible to hold the magnets 13 in the axial direction with a stronger retention force.

As is described above, the rotary electric machine 100 includes the stator 4, the rotor core 12 provided on the inner circumferential side of the stator 4 and fixed to the output shaft 2 of the rotor 3, the plurality of magnets 13 arranged in the circumferential direction and fixed to the outer circumferential portion 18 of the rotor core 12, and the magnet holder 14 fixing the plurality of magnets 13 to the outer circumferential portion 18 of the rotor core 12, the magnet holder 14 includes the base portion 22 which is provided on a side of one surface of the rotor core 12 in the axial direction and through which the output shaft 2 is inserted, and the arm portion 21 which has the first end connected to the base portion 22 and extends in the axial direction of the output shaft 2, and the base portion 22 includes the inner circumferential portion 23 having an annular shape, the outer circumferential beam 24 having an annular shape and provided on an outer circumferential side of the inner circumferential portion 23, and the connection beam 25 connecting the inner circumferential portion 23 and the outer circumferential beam 24, the first end of the arm portion 21 being connected to the outer circumferential beam 24. In this case, because the outer circumferential beam 24 of the magnet holder 14 deforms when the magnets 13 are press-fitted to the magnet holder 14, the arm portion 21 can fix the magnets 13 without the arm portion 21 yielding, and accordingly the arm portion 21 does not open and vibration in the magnets 13 does not develop. Accordingly, the magnet holder 14 can fix the magnets 13 to the rotor core 12 while suppressing vibration in the magnets 13, and therefore the positioning accuracy of the magnets 13 is improved and the performance of the rotary electrical machine 100 is improved.

In addition, the magnets 13 are disposed on the outer circumferential portion 18 of the rotor core 12, and the base portion 22 of the magnet holder is disposed on a side of one surface of the rotor core 12 in the axial direction. Then, the arm portion 21 of the magnet holder 14 is disposed on the outer circumferential surface of the magnet 13, and the magnet 13 is pressed via the arm portion 21 by the outer circumferential beam 24 to fix the magnet 13 between the arm portion 21 and the outer circumferential portion 18 of the rotor core 12. In this manner, the magnet holder 14 can fix the magnets 13 to the rotor core 12 while suppressing vibration in the magnets 13, and it is possible to obtain a rotary electric machine 100 in which the magnets 13 are fixed with high positioning accuracy.

Furthermore, in the present embodiment, although an example in which the present invention is applied to a rotary electric machine 100 having a step-skew structure is shown, the present invention may be applied to a motor that does not have a step-skew structure, and the present invention may be applied to a magnet holder 14 that is not split in the axial direction. Also, the number of the magnet 13 is not limited.

In addition, in the present embodiment, although an example in which the first end of the arm portion 21 is connected to the annular portion 27 and the support portion 28 to connect the outer circumferential beam 24 and the arm portion 21 has been explained, the first end of the arm portion 21 may be connected only to the support portion 28. Even in this case, it is possible to connect the arm portion 21 and the outer circumferential beam 24, and due to the deformation of the outer circumferential beam 24, it is possible to fix the magnets 13 to the outer circumferential portion 18 of the rotor core 12 without the arm portion 21 yielding, and therefore opening in the arm portion 21 does not occur, and vibration in the magnets 13 does not develop.

Also, in the present embodiment, although an example in which the axial holding portion 29 is provided so as to straddle the annular portion 27 of the outer circumferential beam 24 and the connection beam 25, the axial holding portion 29 may be provided in either one of the outer circumferential beam 24 or the connection beam 25. In this case, the axial holding portion 29 may be provided on a surface of the outer circumferential beam 24 or the connection beam 25 on a side facing the magnet 13.

Second Embodiment

Figure 11A:
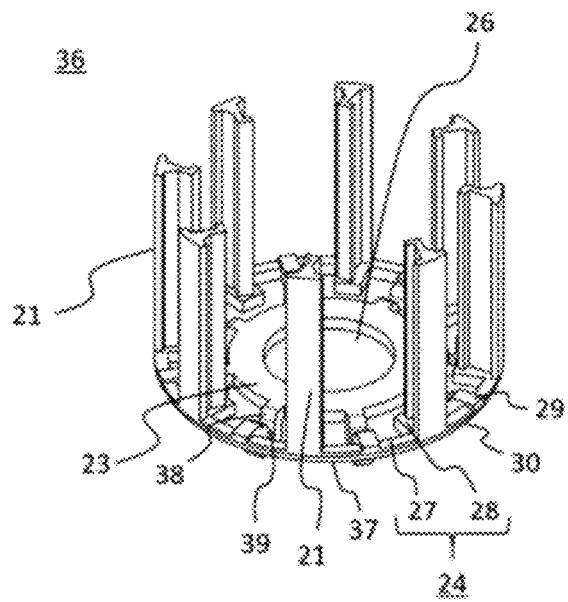
FIGS. 11A and 11B are perspective views showing a magnet holder according to a second embodiment.
Figure 11B:
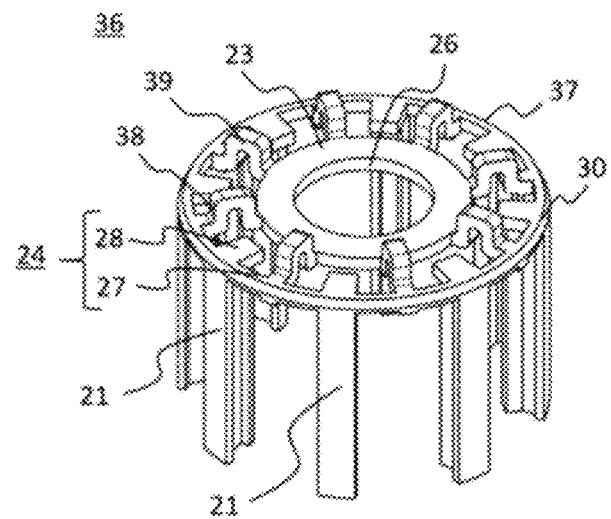

FIGS. 11A and 11B are perspective views showing a magnet holder 36 according to a second embodiment. FIG. 11A shows a perspective view of the magnet holder 36 viewed from a side where the arm portions 21 are provided, and FIG. 11B is a perspective view of the magnet holder 36 viewed from a side where a base portion 37 is provided. A rotary electric machine 100 according to the second embodiment differs from the first embodiment in that a connection beam 38 of the magnet holder 36 is folded back. Components similar to those of the first embodiment are denoted with the same reference symbols, while illustrations and explanations have been omitted.

As shown in FIG. 11A and FIG. 11B respectively, the connection beam 38 connecting the inner circumferential portion 23 and the outer circumferential beam 24 of the magnet holder 36 includes a bend portion 39 that is folded back. In the example of FIG. 11A and FIG. 11B, one bend portion 39 is provided in the connection beam 38 by folding back once a portion of the connection beam 38 between the inner circumferential portion 23 and the outer circumferential beam 24 in a U shape. By providing the bend portion 39 in the connection beam 38, as the connection beam 38 deforms to the outer circumferential side along with the outer circumferential beam 24 when the magnet holder 36 is inserted, it is possible to suppress the opening in the arm portions 21 while accurately positioning the magnets 13.

In addition, by providing the bend portion 39 in the connection beam 38, as the connection beam 38 deforms along with the outer circumferential beam 24 when the magnet holder 36 is inserted, the force needed to insert the magnet holder 36 decreases, the insertion of the magnet holder 36 becomes easier, and therefore the assembly of the rotary electric machine 100 is improved. In addition, as stresses induced in the outer circumferential beam 24 when the magnet holder 36 is inserted are dispersed onto the connection beam 38, damaging of the magnet holder 36 is suppressed, and the degree of reliability is improved. In addition, by dispersing the induced stresses onto the connection beam 38, since the allowance in size variation of the magnets 13 becomes greater, it is possible to reduce the machining accuracy of the magnets 13, thereby making cost reduction of the rotary electric machine 100 possible.

Also, as shown in FIG. 11A (b), the bend portion 39 of the connection beam 38, which is formed by being folded back, is preferably provided so as to protrude to a side opposite to a side where the magnets 13 are provided, that is, protrude in a direction (an upward direction in FIG. 11B (b)) in the axial direction of a side where the base portion 37 is provided. In this manner, since no interference occurs between the magnets 13 and the connection beams 38, the magnetic design of the rotary electric machine 100 is not obstructed.

As is described above, in the rotary electric machine 100 that includes the magnet holder 36 having the arm portion 21 which extends in the axial direction of the output shaft 2, and the base portion 37 which is provided on a side of one surface of the rotor core 12 in the axial direction and through which the output shaft 2 of the rotor 3 is inserted, the bend portion 39 is provided in the connection beam 38 connecting the inner circumferential portion 23 and the outer circumferential beam 24 of the base portion 37. In this case, as the connection beam 38 deforms along with the outer circumferential beam 24 when the magnet holder 36 is inserted, the arm portion 21 is able to fix the magnet 13 without the arm portion 21 yielding, opening in the arm portion 21 does not occur, and vibration in the magnet 13 does not develop. Accordingly, by fixing the magnets 13 to the rotor core 12 by the magnet holder 36, vibration in the magnets 13 is suppressed and the positioning accuracy of the magnets 13 is improved, thereby improving the performance of the rotary electric machine 100. Furthermore, the manufacturing method of the rotary electric machine 100 in the present embodiment is the same as that explained for the manufacturing method of the first embodiment.

Modification Examples

Figure 12A:
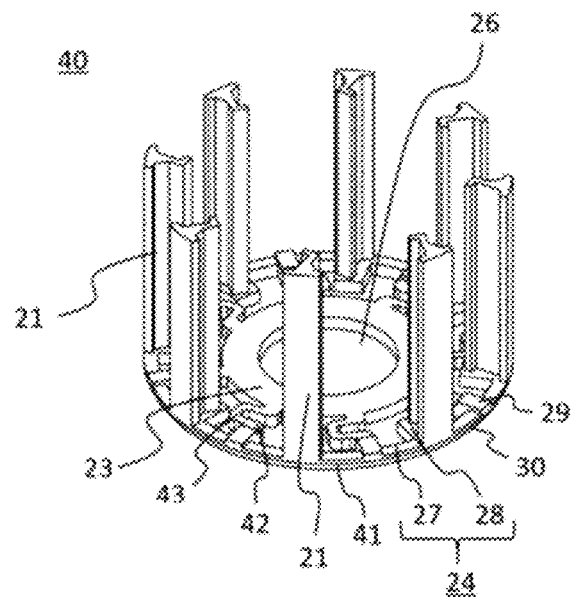
FIGS. 12A and 12B are perspective views showing a modified example of the magnet holder according to the second embodiment.
Figure 12B:
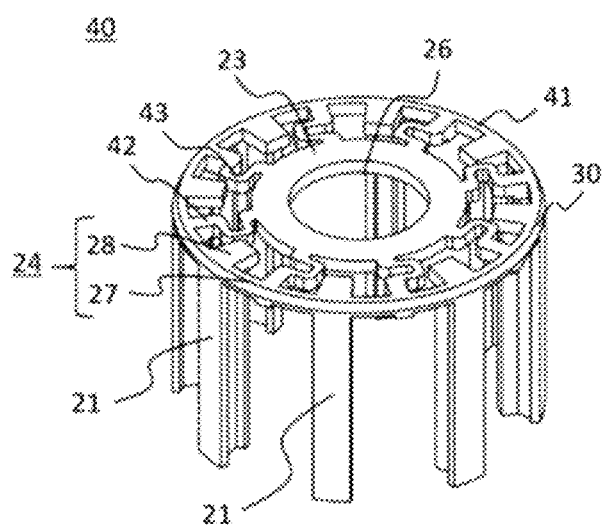

Next, a modification example of a magnet holder 40 according to the present embodiment will be explained. FIGS. 12A and 12B are is a perspective views showing a modification example of the magnet holder 40. In the explanation above, the example in which the bend portion of the connection beam, which is formed by being folded back, protrudes in the direction in the axial direction of the side where the base portion is provided has been explained. However, the direction of protrusion of the bend portion does not have to be the direction in the axial direction of the side where the base portion is provided. In other words, as shown in FIG. 12A (a) and FIG. 12B (b), a bend portion 43 of a connection beam 42 provided in a base portion 41 may protrude in the circumferential direction. In this manner, since the bend portion 43 of the connection beam 42 does not interfere with the fold back portion of the cover 15, it is possible to make the overall downsizing of the rotary electrical machine 100.

Furthermore, in the present embodiment, although the example in which one bend portion 39, 43 is provided in the connection beam 38, 42 of the magnet holder 36, has been explained, a plurality of bend portions 39, 43 may be provided in the connection beam 38, 42. In other words, the connection beam 38, 42 may be formed by being folded back multiple times. In this manner, since the deformation of the connection beam 38, 42 is induced, it is possible to fix the magnet 13 without the arm portion yielding, opening in the arm portion does not occur, and the development of vibration in the magnet 13 can be suppressed.

Third Embodiment

Figure 13:
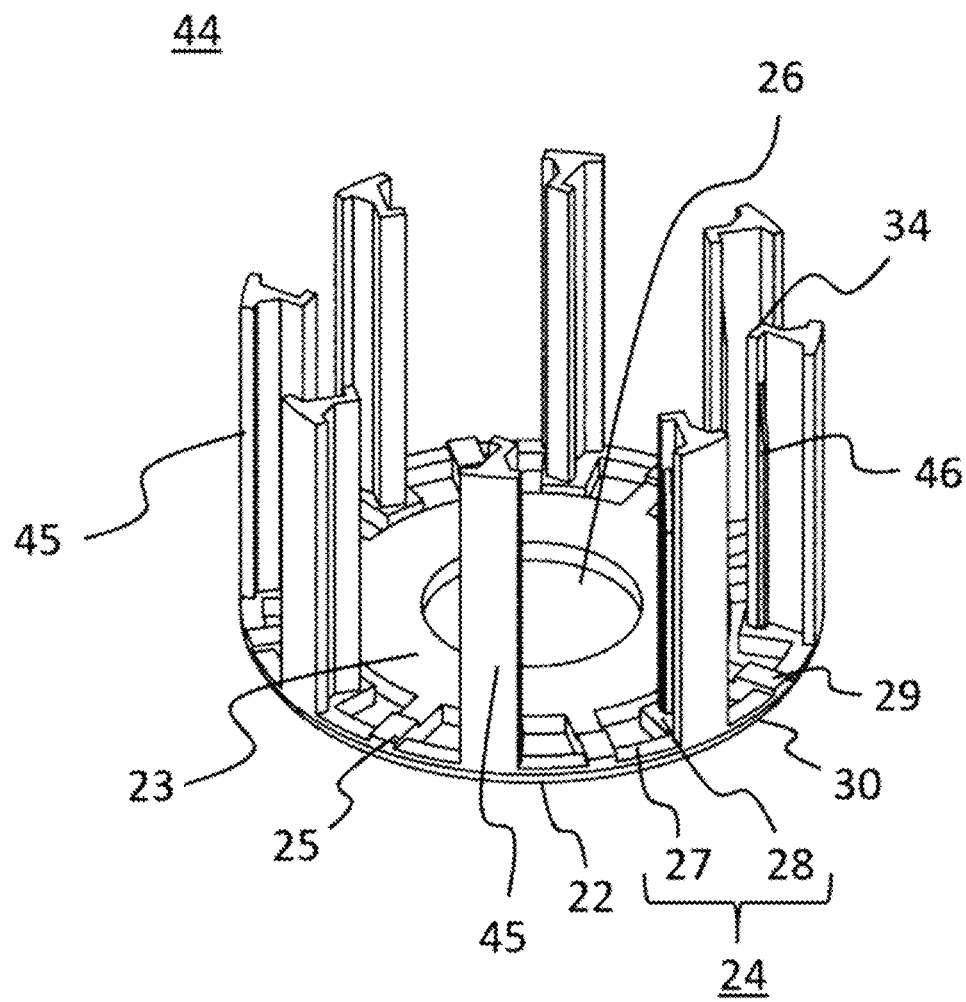
FIG. 13 is a perspective view showing a magnet holder according to a third embodiment.
Figure 14:
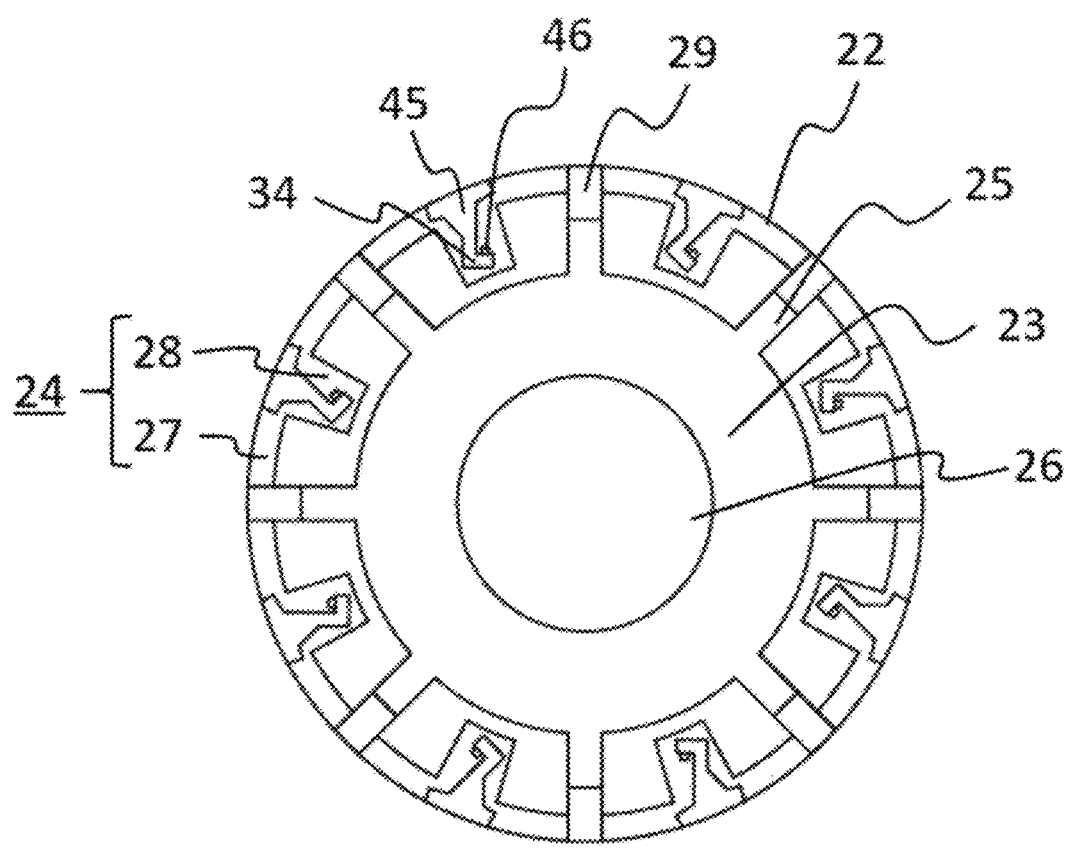
FIG. 14 is a plan view showing the magnet holder according to the third embodiment.

FIG. 13 shows a perspective view showing a magnet holder 44 according to a third embodiment. FIG. 14 shows a plan view showing the magnet holder 44 according to the third embodiment. A rotary electric machine 100 according to the present embodiment differs from the first embodiment in that a rib 46 is provided in an arm portion 45 of the magnet holder 44. Components similar to those of the first embodiment have been denoted with the same reference symbols, while illustrations and explanations have been omitted.

As shown in FIG. 13 and FIG. 14, the rib 46 is provided on the outer circumferential side of the fall prevention portion 34 in the arm portion 45 of the magnet holder 44. Here, a thickness of the rib 46 is set such that the rib 46 is press-fit into the mating portion 20. As the rib 46 is provided in the arm portion 45, because a gap is not formed between the arm portion 45 and the mating portion 20, the force to retain the magnet 13 by the arm portion 45 increases, and vibration in the magnets 13 can be suppressed.

In addition, it is preferable to form the rib 46 such that the thickness of the rib 46 on a side (a far side of the paper on FIG. 14) where the rib 46 is connected to the base portion of the arm portion 45 is less than the thickness of the rib 46 on a side (a front side of the paper on FIG. 14) opposite to the side where the base portion is provided, that is, on a tip side of the arm portion 45. In this manner, insertion of the magnet holder 44 becomes easier. Furthermore, the length of the rib 46 may be appropriately changed.

As is described above, in the rotary electric machine 100 that includes the magnet holder 44 having the arm portion 45 which extends in the axial direction, and the base portion which is provided on a side of one surface of the rotor core 12 in the axial direction and through which the output shaft 2 of the rotor 3 is inserted, by providing the rib 46 on the fall prevention portion 34 in the arm portion 45 on an outer circumferential side, a retaining force of the magnet 13 by the arm portion 45 is improved. Accordingly, because the magnets 13 are fixed to the rotor core 12 by the magnet holder 46 while suppressing vibration in the magnets 13 and the retaining force of the magnet 13 by the arm portion 45 increases, the positioning accuracy of the magnets 13 is improved, thereby improving the performance of the rotary electric machine 100. Furthermore, a manufacturing method of the rotary electric machine 100 in the present embodiment is the same as that explained for the manufacturing method of the first embodiment.

Furthermore, in the first to third embodiments, although terminologies such as L shaped and U shaped have been used to explain the shapes and so on of parts, these terminologies take into consideration the range of manufacturing tolerances and variances that arise during assembly. In other words, it is acceptable to include tolerances or variances that arise in the manufacturing process regarding shapes of parts of the rotary electrical machine 100.

In addition, regarding the embodiments disclosed in this description, the various embodiments may be freely combined, and each of the embodiments may be modified or omitted as deemed appropriate within the range thereof.

REFERENCE SIGNS LIST

Reference Symbol Explanation

1: Motor case
2: Output shaft
3: Rotor
4: Stator
5: Armature winding
6: Annular wiring portion
7: End winding portion
8: Frame
9: First bearing
10: Second bearing
11: Sensor rotor
12: Rotor core
13: Magnet
14, 36, 40, 44: Magnet holder
15: Cover
16a, 16b: Core plate
17: Fixing hole
18: Outer circumferential portion
19: Protruding portion
20: Mating portion
21, 45: Arm portion
22, 37, 41: Base portion
23: Inner circumferential portion
24: Outer circumferential beam
25, 38, 42: Connection beam
26: Insertion hole
27: Annular portion
28: Support portion
29: Axial holding portion
30: Guide portion
31: Magnet holding portion
32: First retaining surface
33: Second retaining surface
34: Fall prevention portion
35: Cover end surface
39, 43: Bend portion
46: Rib
100: Rotary electric machine

The invention claimed is:

1. A rotary electric machine comprising:
a stator;
a rotor core provided on an inner circumferential side of the stator and fixed to an output shaft of a rotor;
a plurality of magnets arranged in a circumferential direction and fixed to an outer circumferential portion of the rotor core; and
a magnet holder fixing the plurality of magnets to the outer circumferential portion of the rotor core,
wherein the magnet holder includes a base portion which is provided on a side of one surface of the rotor core in an axial direction and through which the output shaft is inserted, and an arm portion which has a first end connected to the base portion and extends in the axial direction, and
the base portion includes an inner circumferential portion having an annular shape, an outer circumferential beam having an annular shape and provided on an outer circumferential side of the inner circumferential portion and spaced apart from the inner circumferential portion, and a connection beam connecting the inner circumferential portion and the outer circumferential beam, the first end of the arm portion being connected to the outer circumferential beam.

2. The rotary electric machine according to claim 1, wherein the outer circumferential beam includes an annular portion having an annular shape and provided on an outer circumferential side of the inner circumferential portion, and a support portion which protrudes from the annular portion toward an inner circumferential side and to which the first end of the arm portion is connected, and
the connection beam connects the inner circumferential portion and the annular portion.

3. The rotary electric machine according to claim 1, wherein
the rotor core includes a mating portion extending in the axial direction,
the arm portion includes a magnet holding portion covering an outer circumferential surface of the magnet, and a fall prevention portion provided on an inner circumferential side of the magnet holding portion, and
the mating portion and the fall prevention portion are mated with each other to fix the arm portion to the rotor core.

4. The rotary electric machine according to claim 3, wherein
the arm portion includes a first retaining surface and a second retaining surface each of which regulates a movement of the magnet in the circumferential direction, and
the fall prevention portion has an angle with the first retaining surface and the second retaining surface.

5. The rotary electric machine according to claim 3, wherein a width of the mating portion is larger than a thickness of the fall prevention portion.

6. The rotary electric machine according to claim 3, wherein a rib is provided on a surface of the fall prevention portion of the magnet holder on an outer circumferential side.

7. The rotary electric machine according to claim 1, wherein the connection beam includes a bend portion formed by folding back the connection beam.

8. The rotary electric machine according to claim 1, wherein
a plurality of the rotor cores are arranged in the axial direction and fixed to the output shaft, and
the magnets having similar polarity are fixed to the plurality of the rotor cores, respectively, at positions shifted from each other by a predetermined angle in the circumferential direction.

9. A rotary electric machine comprising:
a stator;
a rotor core provided on an inner circumferential side of the stator and fixed to an output shaft of a rotor;
a plurality of magnets arranged in a circumferential direction and fixed to an outer circumferential portion of the rotor core; and
a magnet holder fixing the plurality of magnets to the outer circumferential portion of the rotor core,
wherein the magnet holder includes a base portion which is provided on a side of one surface of the rotor core in an axial direction and through which the output shaft is inserted, and an arm portion which has a first end connected to the base portion and extends in the axial direction,
the base portion includes an inner circumferential portion having an annular shape, an outer circumferential beam having an annular shape and provided on an outer circumferential side of the inner circumferential portion, and a connection beam connecting the inner circumferential portion and the outer circumferential beam, the first end of the arm portion being connected to the outer circumferential beam, wherein
a protruding portion is provided on the outer circumferential portion of the rotor core, and is disposed on an end portion of the rotor core on a side opposite to a side where the base portion is provided,
an axial holding portion holding a side surface of the magnet in the axial direction is provided on a surface of at least one of the outer circumferential beam and the connection beam on a side facing the magnet, and
the protruding portion and the axial holding portion are disposed to face each other.

10. A method of manufacturing a rotary electric machine comprising:
arranging a plurality of magnets in a circumferential direction and disposing the plurality of magnets on an outer circumferential portion of a rotor core;
disposing a base portion of a magnet holder on a side of one surface of the rotor core in an axial direction, the base portion including an inner circumferential portion having an annular shape, an outer circumferential beam having an annular shape and provided on an outer circumferential side of the inner circumferential portion and spaced apart from the inner circumferential portion, and a connection beam connecting the inner circumferential portion and the outer circumferential beam; and
disposing an arm portion, which has a first end connected to the outer circumferential beam and extends in the axial direction, of the magnet holder on an outer circumferential surface of the magnet and pressing the magnet via the arm portion by the outer circumferential beam to fix the magnet between the arm portion and the outer circumferential portion of the rotor core.

* * * * *